(12) United States Patent  
Svabek et al.

(10) Patent No.: US 9,078,542 B2  
(45) Date of Patent: Jul. 14, 2015

(54) WIRE BASKET HAVING AN ERGONOMIC WIRE HANDLE

(71) Applicant: Archer Wire International Corporation, Bedford Park, IL (US)

(72) Inventors: Lawrence J Svabek, Orland Park, IL (US); Leonard J Svabek, Orland Park, IL (US); Richard J Svabek, Lemont, IL (US)

(73) Assignee: Archer Wire International Corporation, Bedford Park, IL (US)

( * ) Notice: Subject to any disclaimer, the term of this patent is extended or adjusted under 35 U.S.C. 154(b) by 349 days.

(21) Appl. No.: 13/689,309

(22) Filed: Nov. 29, 2012

(65) Prior Publication Data

US 2014/0144332 A1    May 29, 2014

(51) Int. Cl.
*A47J 37/12* (2006.01)
*B65D 6/08* (2006.01)
*B25G 1/10* (2006.01)
*B25G 1/00* (2006.01)

(52) U.S. Cl.
CPC .............. *A47J 37/1295* (2013.01); *B25G 1/102* (2013.01); *B65D 7/20* (2013.01); *B25G 1/00* (2013.01)

(58) Field of Classification Search
CPC ............. B25G 1/102; B25G 1/00; B65D 7/20
USPC ................... 99/407, 413, 411, 410, 450, 394; 220/485; 294/57; 16/430, 110.1; 211/181.1; 217/125
See application file for complete search history.

(56) References Cited

U.S. PATENT DOCUMENTS

| | | | |
|---|---|---|---|
| 2,112,990 | A | 4/1938 | Hunter |
| 2,658,444 | A | 11/1953 | Wheeler |
| 3,047,329 | A * | 7/1962 | Gunderson, Jr. et al. .. 294/68.21 |
| 3,331,309 | A * | 7/1967 | Proffitt ............................ 99/411 |
| 3,371,950 | A | 3/1968 | Stap |
| 3,380,376 | A | 4/1968 | Preis |
| 4,189,993 | A | 2/1980 | Kaufman |
| 5,992,306 | A | 11/1999 | Chiang |
| 6,176,175 | B1 | 1/2001 | Moreth |
| 6,526,876 | B2 * | 3/2003 | Kahler et al. .................... 99/394 |
| 7,341,162 | B2 | 3/2008 | Svabek et al. |
| 7,383,963 | B2 | 6/2008 | Svabek et al. |
| 7,775,156 | B2 * | 8/2010 | Sus et al. ......................... 99/410 |

* cited by examiner

*Primary Examiner* — Reginald L Alexander

(57) ABSTRACT

A fry basket is provided with an ergonomic handle. The handle is ergonomic by being formed from linear or substantially linear sections of rigid wires, which are laterally and vertically spaced away from each other to provide a structure formed of rigid wires that resembles or similar to a large-diameter cylindrical handle or dowel.

17 Claims, 10 Drawing Sheets

FIG. 1

WIRE BASKET HAVING AN ERGONOMIC WIRE HANDLE

BACKGROUND

Wire mesh baskets are commonly used in restaurants to deep fry food. Prior art wire fry baskets are comprised of three components: a relatively fine-mesh wire basket; a frame to which the mesh basket is attached and a handle by which the mesh basket, suspended on the frame, can be immersed into and removed from a hot oil bath. The frame portion and the handle portion are typically made of a one or more individual lengths of rigid solid wire bent at predetermined locations such that the frame and at least part of the handle are formed from one or more individual lengths of rigid wire. Since the frame and handle are sometimes formed from the same wire pieces, the frame and the handle might thus be considered to be one and the same. Such baskets have been used for years and are nearly ubiquitous in restaurants and food service institutions.

A problem with prior art wire baskets is that their handle portions can be somewhat uncomfortable to grasp and maneuver when the basket portions are loaded. The rigid wires from which the handle is formed are relatively narrow. When a wire fry basket is even partially full, grasping a prior art handle that is formed from narrow wires can be somewhat uncomfortable or even painful. A wire basket having a handle that approximates the "feel" of a large diameter handle and which enables a user to manipulate or maneuver the basket when it is loaded, would be an improvement over the prior art.

BRIEF DESCRIPTION OF THE FIGURES

FIG. 1 is a perspective view of a first embodiment of a fry basket;

DETAILED DESCRIPTION

Figure 1:
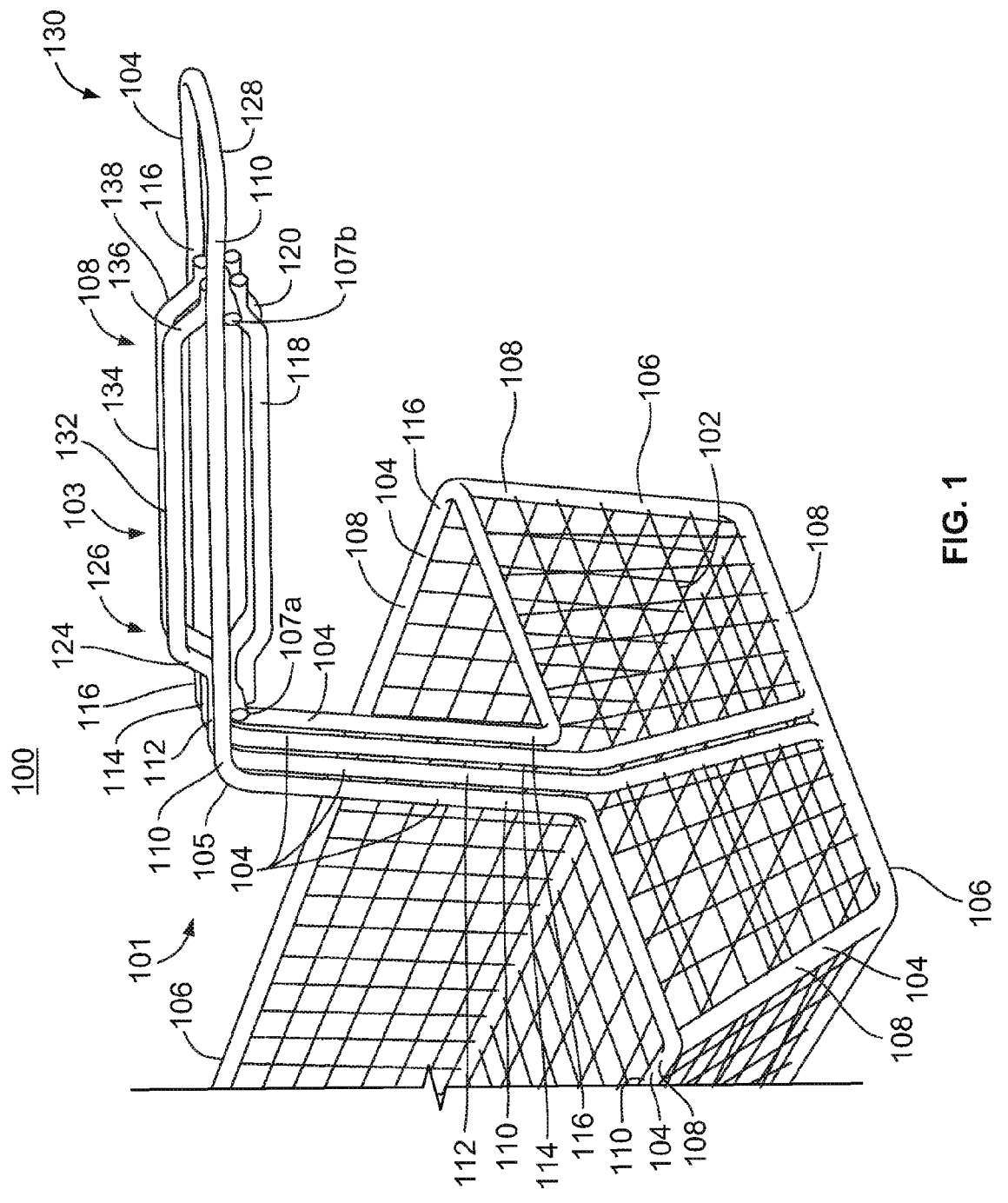

FIG. 1 is a perspective view of a first embodiment of a fry basket 100 having a wire mesh basket 102 supported by rigid wires 104 that form a frame 106. The wires that form the frame 106 also form at least part of an ergonomic handle (handle) 108 and vice versa.

Figure 2:
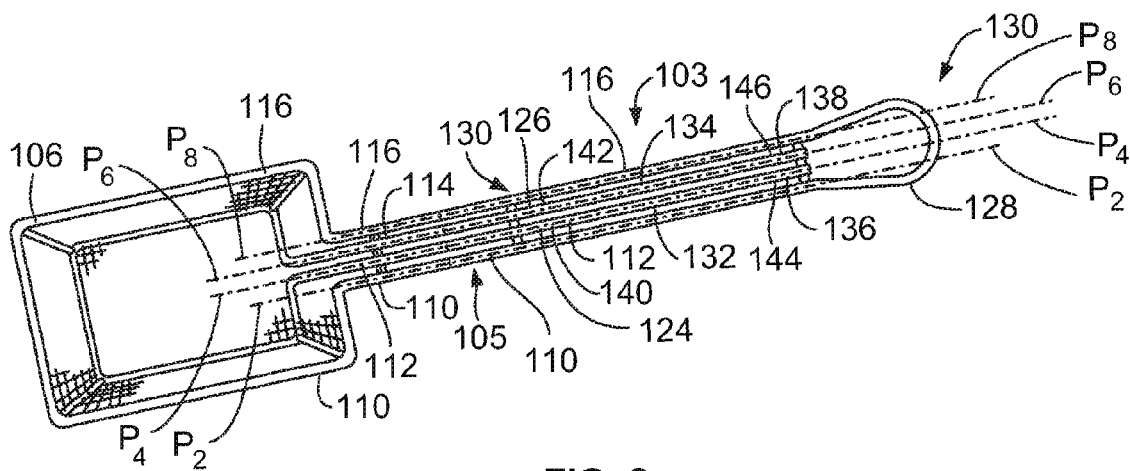
FIG. 2 is a top view of the fry basket first embodiment.
Figure 3:
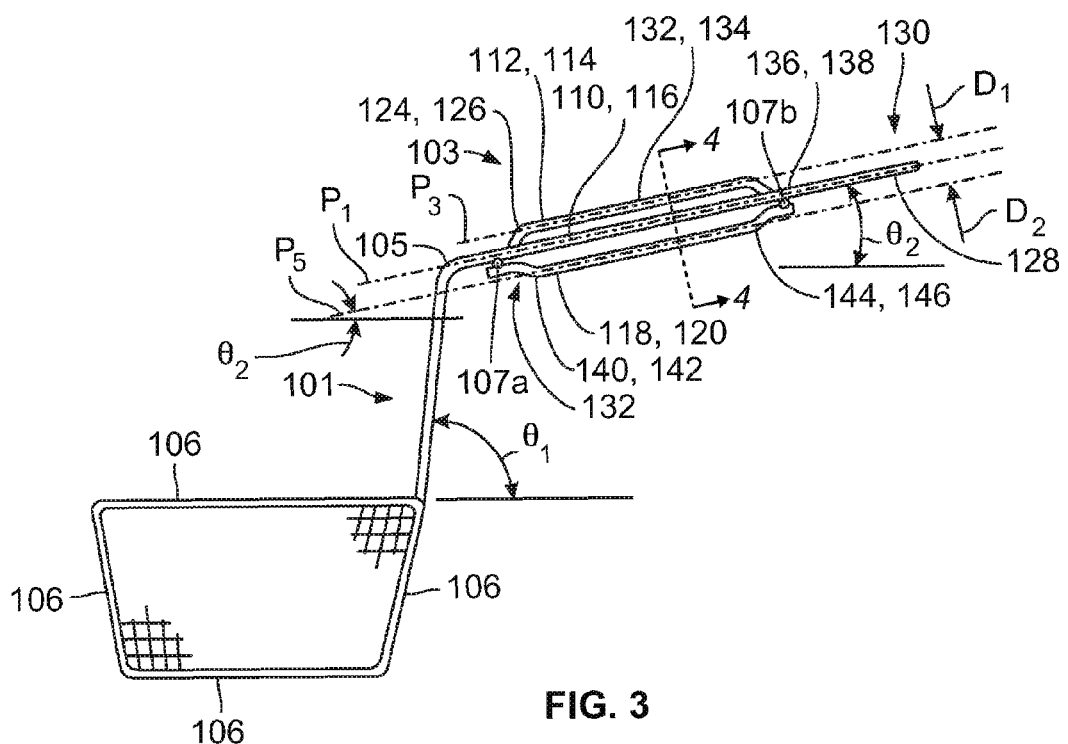
FIG. 3 is a side view of the fry basket first embodiment.
Figure 4:
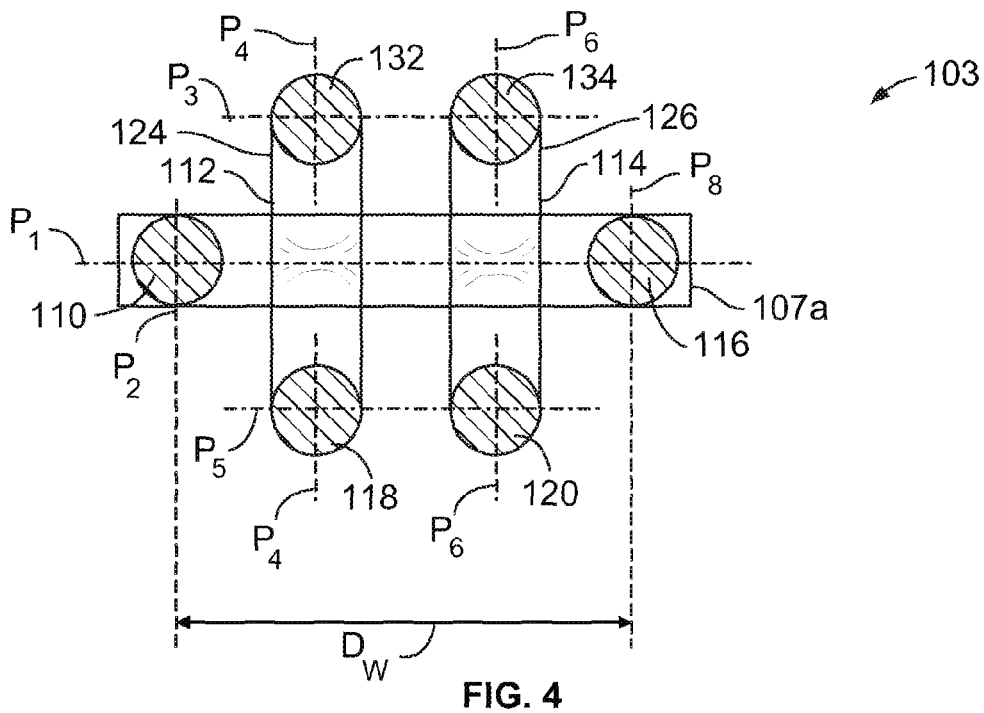
FIG. 4 is a cross sectional view of the handle shown in FIG. 3, taken through section lines 4-4.
Figure 5:
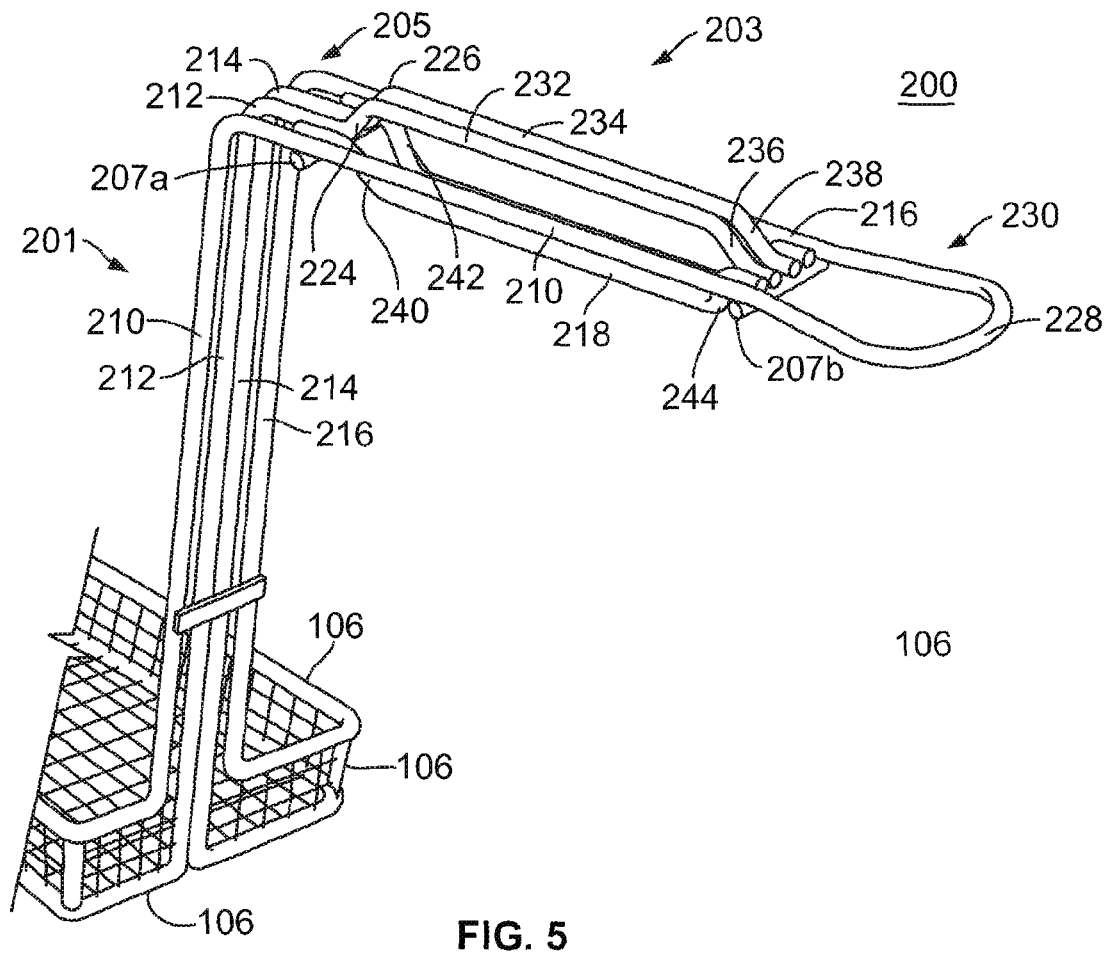
FIG. 5 is a perspective view of a second embodiment of a fry basket.
Figure 6:
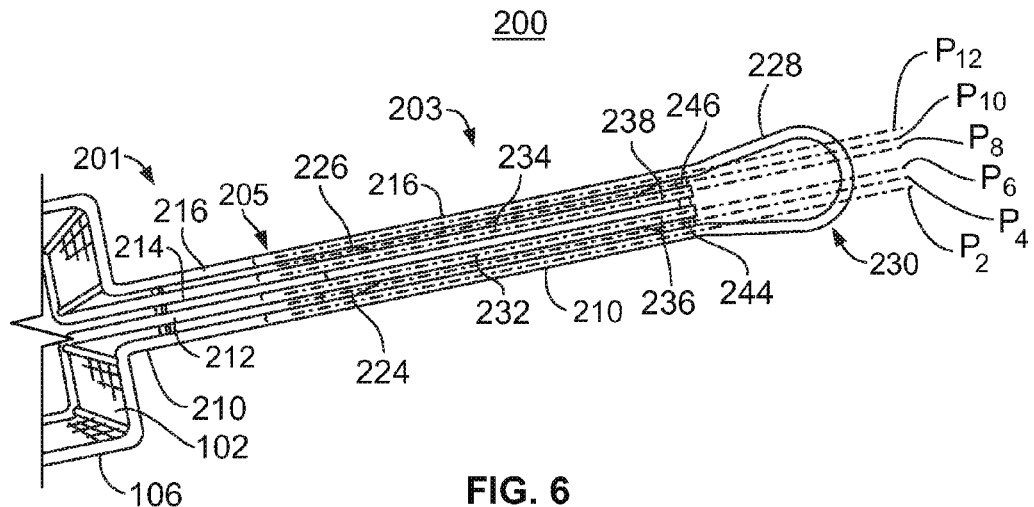
FIG. 6 is a top view of the second embodiment.
Figure 7:
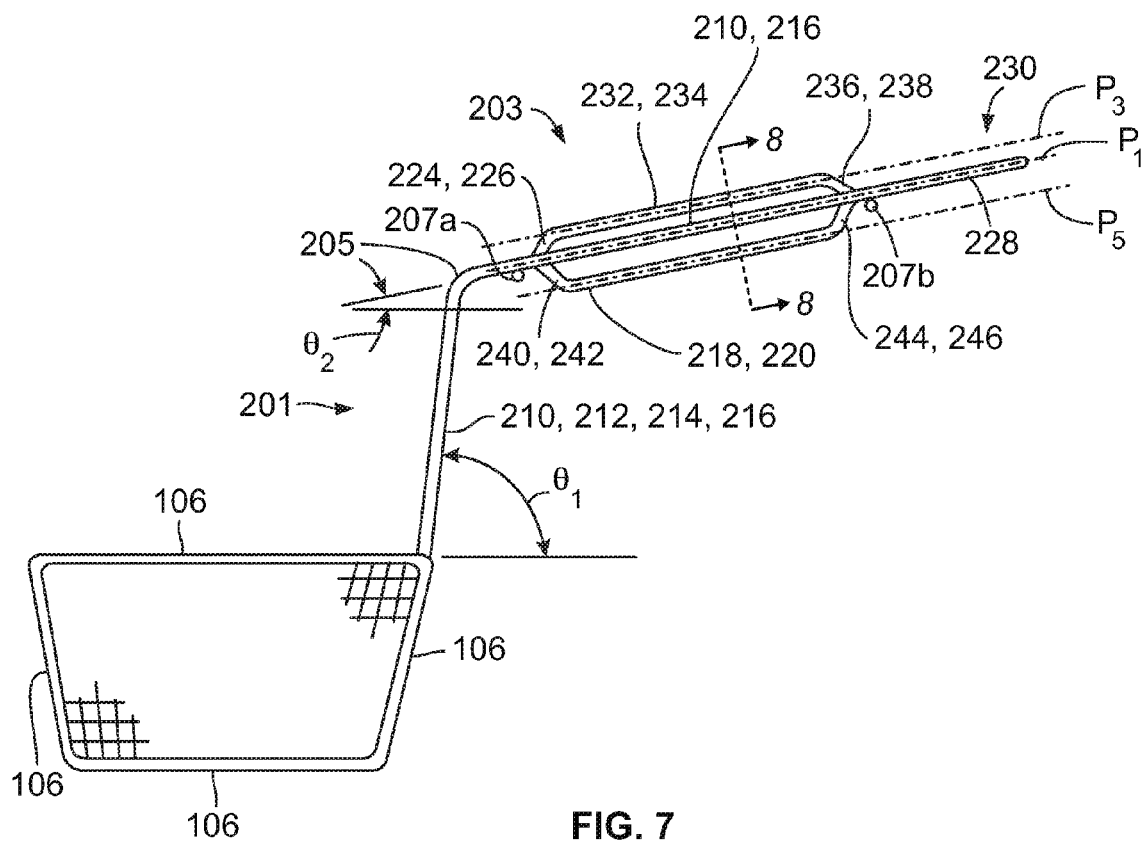
FIG. 7 is a side view of the second embodiment.

FIG. 2 is a top view of the fry basket first embodiment. FIG. 3 is a side view and FIG. 4 is a cross sectional view of the handle 108 taken through section lines 4-4.

The ergonomic handle 108 is made of several sections of rigid wire. The various sections of rigid wire are spatially arranged relative to each other such that when a user lifts the fry basket 100 using the handle 108, the handle 108 provides a more comfortable "feel" of a pole or rod having a diameter much greater than the diameter of any one of the individual wires. Multiple rigid wires that comprise the handle 108 are vertically and horizontally separated from each other in order to approximate the shape of a round or nearly round, substantially elliptically-shaped handle.

For clarity purposes, the ergonomic handle 108 is considered herein to be comprised of at least two portions. A first portion 101 is comprised of multiple wires that extend upwardly from the basket supporting-frame 106. The first portion 101 is elevated or inclined relative to horizontal at a first inclination angle $\theta_1$, which is preferably steep. In a preferred embodiment, the first inclination angle is less than ninety degrees and preferably between about seventy and eighty degrees relative to horizontal. Since the wires that comprise the first portion 101 are straight and since the first portion 101 is elevated at an angle that is nearly equal to ninety degrees, the first portion 101 is considered to be relatively straight and relatively upright.

As can be seen in FIG. 1, the relatively straight and relatively upright first portion 101 is comprised of four rigid wires 110, 112, 114 and 116 that are laterally spaced apart from each other, essentially parallel to each other and essentially the same length through-out the first portion 101. The four wires 110, 112, 114 and 116 lie in essentially the same inclined geometric plane, at least through-out the first portion. The wires 110, 112, 114 and 116 extend upwardly from the basket frame 106 to a rear-directed bend 105, i.e., a bend that directs all of the wires 110, 112, 114 and 116 rearward and away from the basket 102, whereat all four wires 110, 112, 114, 116 continue extending away from the wire mesh basket 102 at least to a first cross-brace wire 107A, which is located where the four wires 110, 112, 114 and 116 are re-configured to form a second portion 103 of the handle 108.

FIG. 3 shows a second portion 103 of the handle 108 that begins at the bend 105 is more horizontal and inclined at a second inclination angle $\theta_2$ relative to horizontal. The second inclination angle $\theta_2$ is preferably between about ten and about forty degrees relative to horizontal and more preferably between about fifteen and about twenty degrees relative to horizontal. The figures show that the four wires 110, 112, 114 and 116 extend away from the bend 105, lying in the same inclined plane $P_1$, which is inclined at the second inclination angle $\theta_2$.

FIGS. 1-4 show that the second portion 103 of the ergonomic handle 108 is comprised of the four (4) wires 110, 112, 114, 116 that comprise the first portion 101 of the ergonomic handle 108, plus two additional rigid wires 118, 120 for a combined total of six (6) lengths or sections of rigid wires 110, 112, 114, 116, 118 and 120. The six sections of rigid wire 110, 112, 114, 116, 118 and 120 that comprise the second portion 103 are vertically and horizontally arranged such that at least portions of their respective lengths lie in different vertically-oriented geometric planes and different transverse-oriented geometric planes. Stated another way, portions of the wires 110, 112, 114, 116, 118 and 120 that comprise the second portion 103, are "configured," to give at least the second portion 103 of the handle 108 a "feel" that is similar to or reminiscent of a relatively large-diameter conventional prior art wooden dowel or handle, without the weight, cost or sanitization problems associated with prior art wooden handles thus making the handle 108 shown in the figures easier to grip and more comfortable to use, especially during extended periods of time.

As used herein, the term "dowel" refers to a round, wood rod or round wood stick.

Still referring to FIGS. 1-4, both of the two outer-most wires 110, 116, i.e., the "outside" wires 110 and 116, are relatively straight, at least from the bend 105 "back" toward a loop 128, which they form at the extreme end 130 of the handle 108. Stated another way, the two "outside" wires 110 and 116 are actually a single length of rigid wire, bent to form a loop 128 that comprises the user's end 130 of the handle 108. The two outside wires 110 and 116 extend away from the bend 105 at the same second inclination angle $\theta_2$ relative to horizontal. The two outside wires 110, 116 are thus considered herein to be straight and parallel to each other, at least to where they combine to form the loop 128. Since the two outer-most wires 110 and 116 are substantially straight, at least from the bend 105 to the loop 128, and since they are both inclined relative to horizontal at the same angle $\theta_2$ they are considered herein to be co-planar, i.e., at least their centers lie in the same first geometric plane $P_1$, which is inclined relative to horizontal at the second inclination angle $\theta_2$.

As used herein, "substantially" is modifier that implies "approximate," rather than "perfect" or exact. As used herein it indicates that a specified thing, quality or dimension is largely, but not necessarily, exactly that, which is specified.

Figure 21:
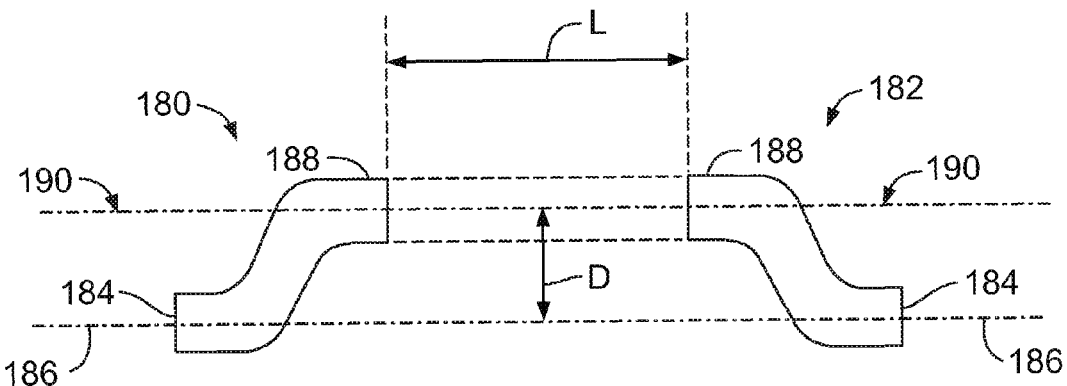

And as used herein, the terms "offset" and "offset bend" are used interchangeably to refer to a relatively abrupt but continuous bend in a length of rigid wire by which a first part of the rigid wire is turned aside, displaced or made "out of line" with a second part of the same wire. FIG. 21 shows side views of two identical offset bends 180 and 182 formed of rigid wire. The two offsets 180 and 182 "face" or mirror each other. Each offset 180 and 182 has a first end 184 and an opposing second end 188. Since the offset bends 180 and 182 are made of rigid wire, the cross sectional shape of which is typically circular, the first end 184 of each offset 180 and 182 is drawn concentric with a center line 186. The second end 188 is also drawn concentric with a center line 190. The separation distance, D, between the two center lines 186 and 190 of the two ends 184 and 188 is considered herein to be the "offset separation" provided by each of the offset bends 180, 182.

When two identical offsets 180 and 182 are arranged as shown in FIG. 21, i.e., flipped horizontally, they are considered herein to be "complementary offsets" because they are opposites or complements of each other. As FIG. 21 is drawn, the two offsets 180 and 182 lie flat in the plane of the figure. The first offset 180 will displace or translate a wire "upwardly" by the separation distance D whereas the second offset 182 will displace or translate a wire "downwardly" by the same distance D. A length of wire between the two second ends 188 of the two mirrored offsets 180 and 182 will thus be translated or displaced "upwardly" by the separation distance D.

Those of ordinary skill in the art will recognize that while the offsets depicted in the figures are complementary and located back-to-back, i.e., at opposite ends of a length of wire, alternate embodiments of back-to-back offset need not be complements of each other. In one alternate embodiment, two otherwise complementary offsets, such as those shown in FIG. 21 need not lie in the same plane. The first offset 180 can be arranged to lie flat in the plane of the figure while the second offset 182 can be arranged such that its first end, which faces away from the first offset, is rotated around centerline 190, either into or out of the plane of the figure. The effect of such an offset being to create a tapered or conical shaped handle.

In the embodiment of the wire basket having an ergonomic wire handle shown in FIG. 1-4, the two "inside" wires 112, 114 of the ergonomic handle 108 are provided with two side-by-side matching vertical offsets 124 and 126 respectively, just beyond the bend 105 in each wire 112, 114. The first two offsets 124 and 126, which are between about two and four inches away from the bend 105 and away from the basket 102, are considered herein to be oriented or "standing" upright in order to maximize the vertical lift or rise, or displacement of the wires 112 and 114 to define corresponding "intermediate" portions or sections 132 and 134 of the inside wires 112 and 114. The intermediate portions or sections 132 and 134 are displaced "upwardly" from the two "outside" wires 110 and 116 by a first offset distance $D_1$, preferably between about one-half inch and about one and one-quarter inch.

The spacing between the two outside wires 110 and 116, the two inside wires 112 and 114 and the first two offsets 124 and 126, is maintained by the wires' attachment to a first cross member 107A formed of rigid wire and attached to all four wires orthogonally.

Two second or "complementary" offsets 136 and 138 located away from the first two offsets 124 and 126 "return" the intermediary portions 132 and 134 of the two inside wires 112, 114, "down" to the first inclined plane $P_1$. The two inside wires 112, 114 terminate just inside the extreme end of the handle at a second cross member 107B, which is attached to all four wires. The offset distance $D_1$ is preferably between about one-half inch and one full inch.

The intermediate offset portions 132 and 134 of the two inside wires 112 and 114 are considered herein to be the portions of the two inside wires 112 and 114 that are between the first two vertical offsets 124 and 126 and the complementary, second two vertical offsets 136 and 138. The vertical height of all offsets is preferably the same. The two intermediate portions 132 and 134 are thus offset from the first transverse plane $P_1$, the edges of which are shown in FIG. 3 and FIG. 4, by the same vertical distance $D_1$.

The intermediate portions 132 and 134 of the two inside wires 112 and 114 are preferably parallel or at least substantially parallel to each other. Both of them are preferably inclined at the second inclination angle $\theta_2$. The intermediate portions 132 and 134 are thus considered herein to be co-planar and to lie in a second plane $P_3$, the edges of which are shown in FIGS. 3 and 4 and which is inclined relative to horizontal at the second inclination angle $\theta_2$.

In a preferred embodiment, $P_3$ is inclined at the same second inclination angle as $P_1$. $P_1$ and $P_3$ are thus considered to be parallel to each other and offset or spaced apart from each other by a first offset distance $D_1$. In an alternate embodiment however, $P_1$ and $P_3$ are not parallel but are instead deliberately inclined at different angles relative to horizontal in order to provide the second portion 103 of the handle 108 with a taper.

As used herein, the term, "transverse" is considered to mean lying or being nearly horizontal. $P_1$, $P_3$ and $P_5$ are thus considered to be transverse planes. Their edges are shown in FIGS. 3 and 4.

As the planes $P_1$, $P_3$ and $P_5$ are drawn in the figures, they are inclined at the second inclination angle $\theta_2$ relative to horizontal. Since $\theta_2$ is preferably a small angle, e.g., thirty degrees or less, $P_1$, $P_3$ and $P_5$ are considered herein to be substantially or nearly horizontal or transverse planes. Those of ordinary skill in the art will recognize that $P_1$, $P_3$ and $P_5$ need not be perfectly parallel to each other but can instead be inclined relative to each other by small angles, e.g., less than about ten to twenty degrees.

Two additional wires 118, 120 that comprise the second portion 103 of the ergonomic handle 108 are provided or formed to have downwardly-directed vertical "offsets" 140 and 142 respectively. The two downwardly directed offsets 140, 142 are attached to the first cross member 107A and oriented to lower, drop or depress the two additional wires 118 and 120 "downwardly" from both the two "outside" wires 110 and 116 into a third geometric plane $P_5$, which is also below the two intermediate portions 132 and 134 and the second geometric plane $P_3$. Complementary offsets 144, 146, which are also formed into the two added wires 118, 120, vertically "lift" or raise the two additional wires 118, 120 "upwardly" back to the first inclined plane $P_1$.

The two downwardly-directed offsets 140 and 142 and the two upwardly directed and complementary offsets 144 and 146 are configured to have the same vertical displacement. They offset the two added wires 118 and 120 by the second offset distance $D_2$.

In a first embodiment, the two wires 118 and 120 are substantially parallel to each other. They are considered to lie in the aforementioned third geometric plane $P_5$, which is also preferably parallel to the first plane $P_1$ and is therefore inclined at the same second inclination angle. The portions of the additional wires 118, 120 that lie in the third, lower plane $P_5$ are therefore inclined at the second inclination angle $\theta_2$ and are thus parallel to the two outside wires 110, 116, but vertically separated from the two outside wires 110, 116 by the second offset distance $D_2$. The portions of the additional wires 118, 120 that lie in the lower plane $P_5$ are also separated from the intermediate portions 132, 134 of the two inside wires 112, 114, which lie in the second plane $P_3$, by a third offset distance that is equal to the sum of the two offset distances $D_1$ and $D_2$.

The portions or sections of the two outside wires 110 and 116, which are considered herein to be located "between" the offsets 124, 126, 140, 142 and 136, 138, 144, 146, are considered herein to be "first and second rigid wire portions" that are substantially straight or linear, substantially parallel to each other and substantially co-planar, i.e., lying in a first plane $P_1$, which is inclined at the second inclination angle $\theta_2$ relative to horizontal The intermediate portions or sections 132 and 134 of the inside wires 112, 114 between the offsets 124, 126 and 136, 138 are considered herein to be "third and fourth rigid wire portions," that are also substantially straight or linear, substantially parallel to each other and substantially co-planar but lying in a second plane $P_3$. While $P_1$ and $P_3$ are parallel to each other and inclined at the same second inclination angle $\theta_2$, $P_3$ is drawn as being "above" $P_1$ and therefore considered herein to be vertically separated from $P_1$ by the first vertical separation distance $D_1$. The portions of the two additional wires 118, 120 that are between the offsets 140, 142 and offsets 144, 146 are considered herein to be "fifth and sixth rigid wire portions" that are substantially straight, substantially parallel to each other and lying in a third plane $P_5$. While the third plane $P_5$ is preferably parallel to both $P_1$ and $P_3$ and thus inclined at the second inclination angle $\theta_2$, $P_5$ is "below" $P_1$ and thus vertically offset "downwardly" from $P_1$ by a second vertical separation distance $D_2$.

Referring now to FIGS. 2, 3 and 4, the six wires 110, 112, 114, 116, 118 and 120 can be seen to also lie in planes that are vertical as well as parallel or substantially parallel to each other. As best seen in FIG. 4, the two outside wires 110 and 116 are considered herein as lying in two, substantially parallel vertical planes denominated as $P_2$ and $P_8$. $P_2$ and $P_8$ are horizontally or laterally separated from each other by a distance that defines the handle width, $D_w$. One of the inside wires 112 and one of the additional wires 118 lie in a third vertical plane $P_4$. The other inside wire 114 and the other additional wire 120 lie in a fourth vertical plane $P_6$. The four vertically-oriented planes $P_2$, $P_4$, $P_6$ and $P_8$ can be seen in FIG. 2 and FIG. 4 to be horizontally or "laterally" separated from each other by the same distance. The vertical planes $P_2$, $P_4$, $P_6$ and $P_8$ are also considered to be parallel to each other, which means that intermediate sections identified by reference numerals 132 and 134 are directly "above" the two additional wires 118 and 120 respectively.

The arrangement or configuration of multiple rigid wires 110, 112, 114, 116, 118 and 120 in different vertical and horizontal planes as shown in FIG. 4, approximates the cross sectional shape of a prior art wooden handle or cylinder more closely than does the cross sectional shape of multiple rigid wires that are all co-planar. The arrangement of the rigid wires 110, 112, 114, 116, 118, and 120 as shown in FIGS. 1-4, in at least the second portion 103 of the handle 108, thus provides a more comfortable grip than does various prior art fry basket handles.

Figure 8:
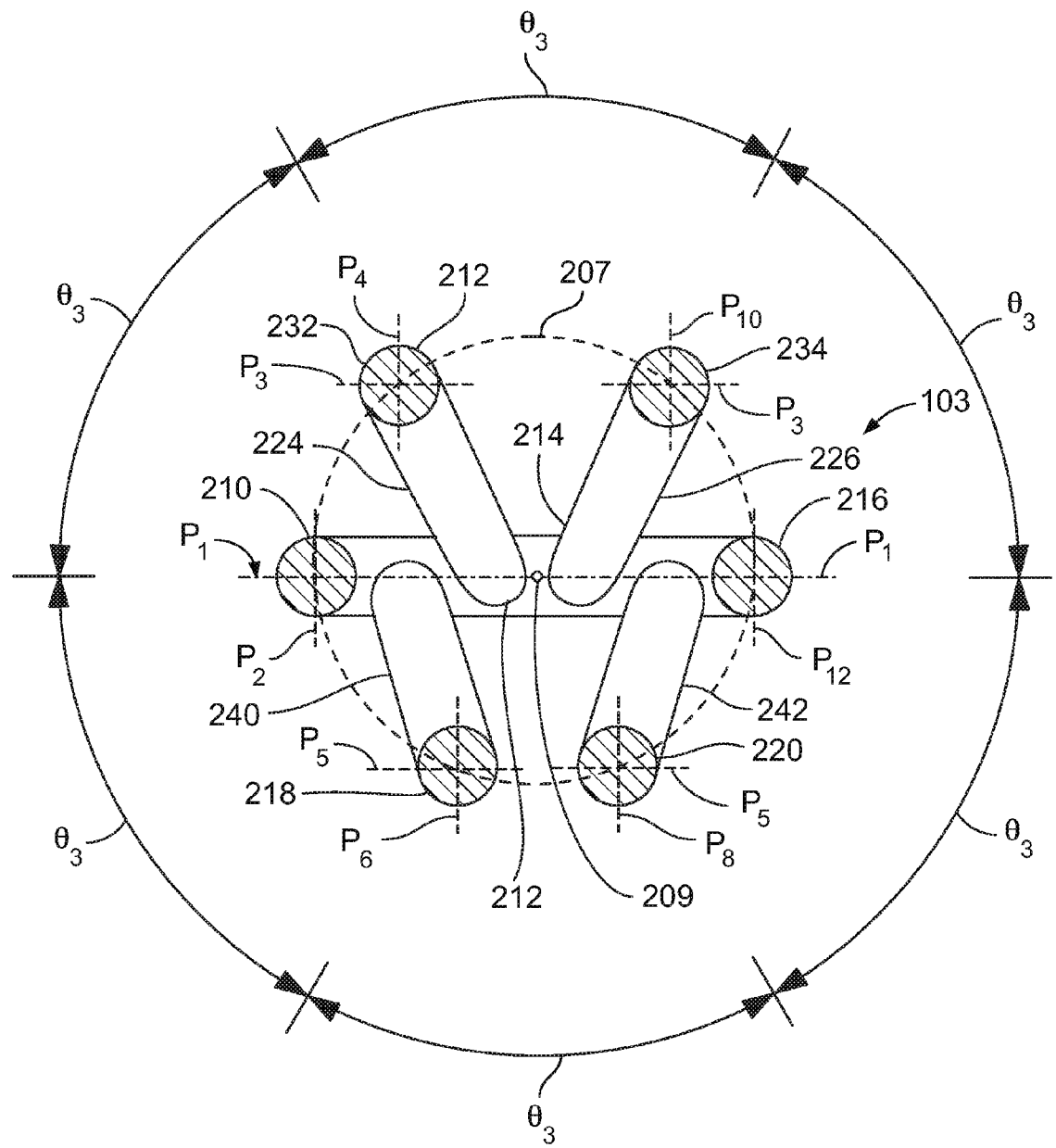
FIG. 8 is a sectional view of the handle, taken through section lines 8-8.

FIGS. 5, 6, 7 and 8 are respectively, the perspective, top, side and sectional views of a second embodiment of a fry basket having an ergonomic handle 200. The differences between the first embodiment of the ergonomic handle shown in FIGS. 1-4 and the second embodiment 200 of the ergonomic handle shown in FIGS. 5-8 are best seen in FIG. 8, which is a sectional view of the handle 200 taken through section lines 8-8. (See FIG. 7.) Put simply, the wires that form the second portion 203 of the handle 200 are arranged such that the geometric centers of the wires are virtually equidistant from and evenly distributed around the center of a geometric circle 207. (See FIG. 8.) The arrangements of the six wires thus resembles or approximates a prior art round handle.

As with the first embodiment, four wires 210, 212, 214 and 216 that comprise a first portion 201 of the handle 200 extend upwardly from a wire mesh basket 102 at a first inclination angle $\theta_1$ to a bend 205. All four wires extend away from the bend 205 at the same inclination angle, $\theta_2$.

A second portion 203 of the handle is formed by portions of the four wires 210, 212, 214 and 216 that continue to extend away from the bend 205 at the second inclination angle $\theta_2$.

As with the first embodiment, the two outside wires 210 and 216 are straight and substantially parallel to each other. They lie in a first transverse plane $P_1$, which is inclined at the second inclination angle $\theta_2$. The two outside wires extend back from the bend 205 at the second inclination angle $\theta_2$ to where they meet each other to form a loop 228 at the extreme end 230 of the handle 200.

The two "inside" wires 212, 214 of the ergonomic handle 200 are provided with two side-by-side offsets 224 and 226 respectively. The offsets 224 and 226 are between about two and four inches away from the bend 205. As best seen in FIG. 8, the two offsets 224 and 226 are not upright or parallel to each other but are instead rotated in opposite directions around the center lines of their first ends (See FIG. 21.). By "rotating" the offsets 224 and 226 as shown in FIG. 8, they raise intermediate sections 232 and 234 of the inside wires 212 and 214 "upwardly" from the plane $P_1$ in which the two "outside" wires 210 and 216 lie by a first offset distance $D_1$ at the same time that offsets 224 and 226 separate the intermediate sections 232 and 234 laterally away from each other such that the center lines of the two intermediate sections 232 and 234 and the center lines of the two outside wires 210 and 216 lie on or at least near the same geometric circle 207.

As with the embodiment shown in FIGS. 1-4, a pair of complementary offsets 236 and 238 return the intermediary portions 232 and 234 of the two inside wires 212, 214, "down" to the first inclined plane $P_1$. The two inside wires 212, 214 terminate just inside the extreme end 230 of the handle 200. The two intermediate sections 232 and 234 are substantially parallel to each other and lie in the same geometric plane $P_3$, which is inclined at the second inclination angle $\theta_2$.

Two additional wires 218, 220 that comprise the second portion 203 of the ergonomic handle 300 are provided with downwardly-directed vertical "offsets" 240 and 242 respectively. As best seen in FIG. 8, the two downwardly directed offsets 240, 242 lower the two additional wires 218 and 220 "downwardly" to a third geometric plane $P_5$ below the first plane $P_1$. The two offsets 240 and 242 also move the two additional wires laterally away from each other such that the center lines of the two additional wires 218, 220 lie on or at least near the same geometric circle 207. Complementary offsets 244, 246, which are also formed into the two added wires 218, 220 vertically "lift" or raise the two additional wires 218, 220 "upwardly" back to the first inclined plane $P_1$. The spacing and arrangement of the wires through-out the second portion 203 is maintained by two cross members 207A and 207B, to which the wires are attached, preferably by welding.

As best shown in FIG. 8, which is a sectional view of the second portion 203 of the handle through section lines 8-8, the center lines of the wires 210, 212, 214, 216, 218 and 220 that form the second portion 203, are located around the center 209 of a geometric circle 207 substantially uniformly. They are also spaced away from the center 209 by substantially the same distance.

Each of the wires 210, 212, 214, 216, 218 and 220 lies in a different, vertically-oriented plane $P_2$, $P_4$, $P_6$, $P_8$, $P_{10}$ and $P_{12}$. The vertically-oriented geometric planes $P_2$, $P_4$, $P_6$, $P_8$, $P_{10}$ and $P_{12}$ are also drawn as being parallel or nearly parallel to each other. The wires being arranged in a circle as shown in FIG. 8 simulates or mimics the cross sectional shape of a prior art wooden handle, dowel, or pole, making at least the second portion 203 of the handle easier to grip and manipulate by giving the second portion 203 more of the "feel" of a round handle.

Figure 9:
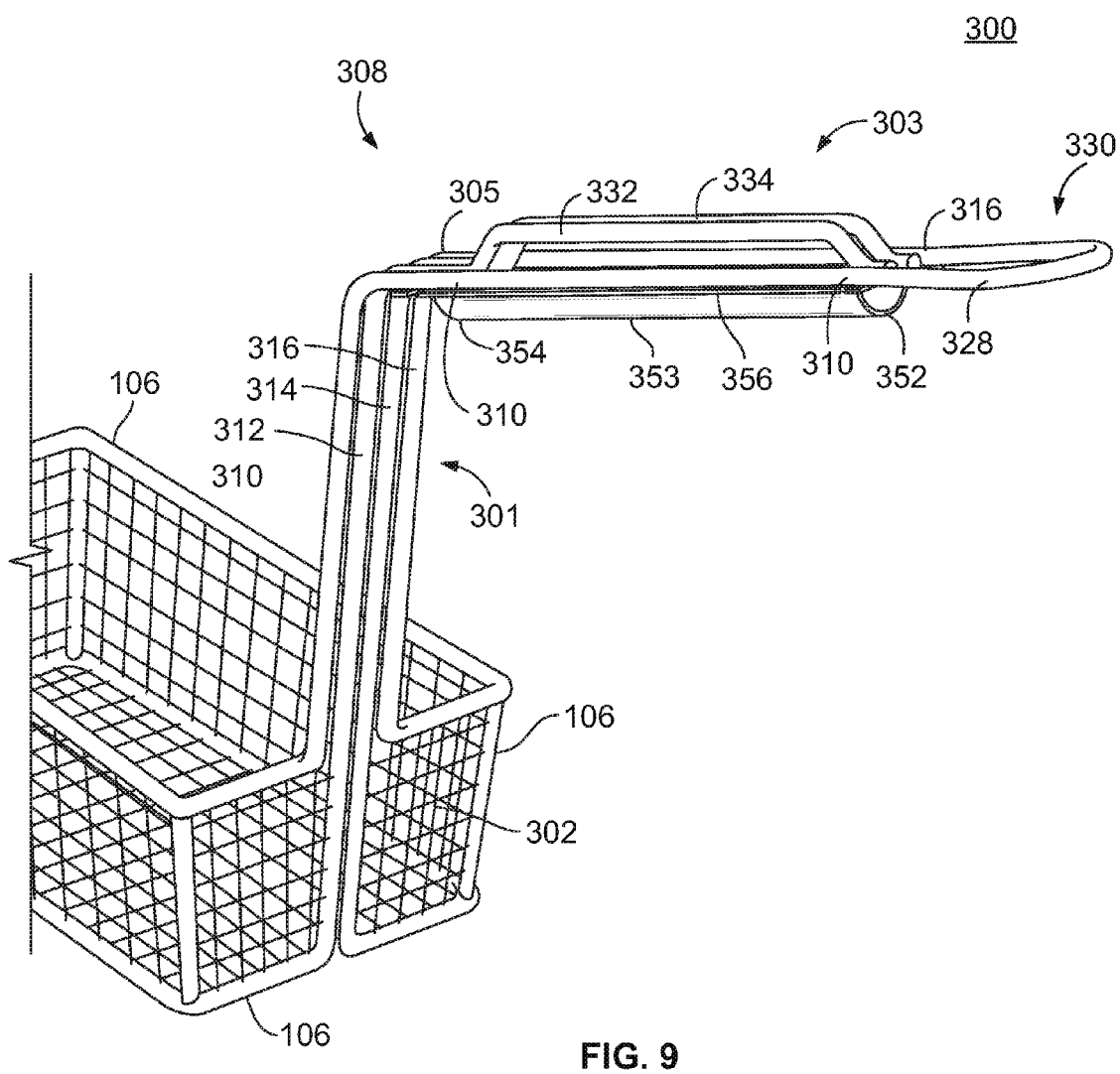
FIG. 9 is a perspective view of a third embodiment of a handle for a third embodiment of a fry basket.
Figure 10:
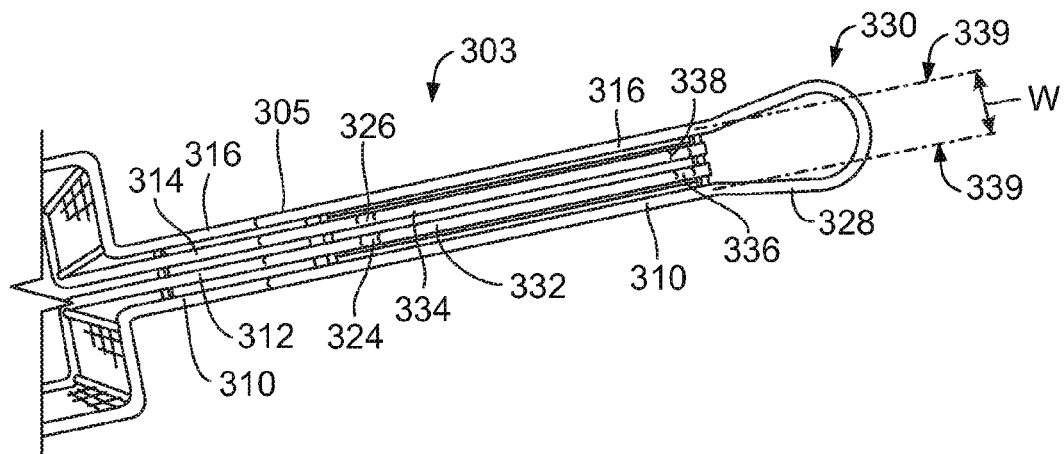
FIG. 10 is a top view of the handle shown in FIG. 9.
Figure 11:
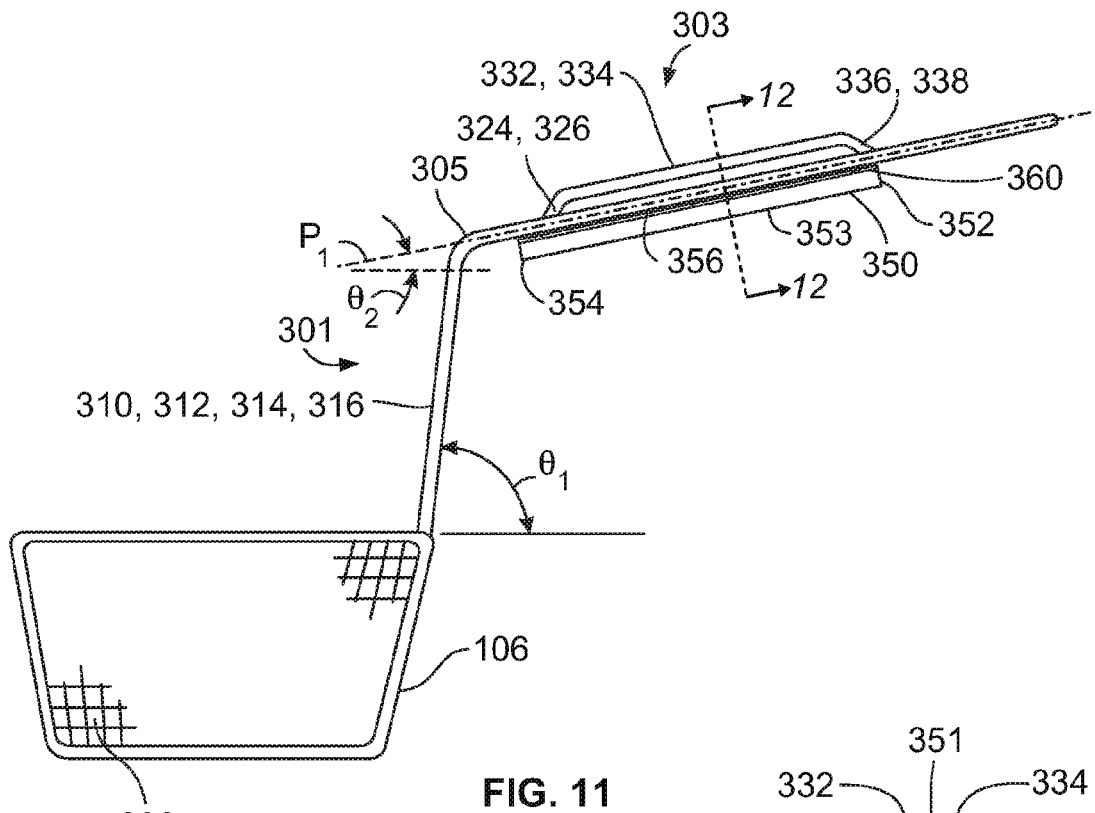
FIG. 11 is a side view of the handle shown in FIG. 9.
Figure 12:
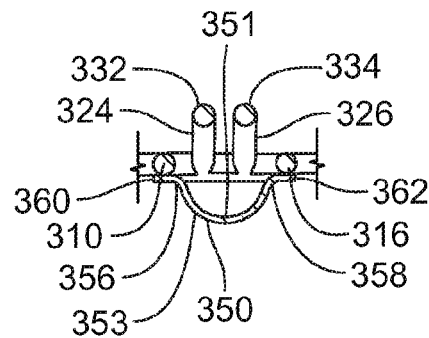
FIG. 12 is a sectional view of the handle shown in FIGS. 9-11, taken through section lines 12-12.

FIGS. 9, 10, 11 and 12, depict another embodiment of a fry basket 300 having an ergonomic handle 308. FIG. 9 is a perspective view of the handle 308. FIGS. 10, 11 and 12 are top, side and sectional views respectively.

A first portion 301 of the handle 308 is comprised of four rigid wires 310, 312, 314 and 316 that extend upwardly from a wire basket 302 to a bend 305. All four wires extend away from the bend 305 at the same angle and lying in essentially the same transverse plane $P_1$. A second portion 303 of the handle 308 is comprised of the two outside wires 310 and 316, which are parallel to each other and which extend straight back from the bend 305 to the loop 328 they form at the extreme end 330 of the handle 308. The two outside wires 310 and 316 lie in the same transverse plane $P_1$ through-out the second portion 303.

As with the other embodiments, the two inside wires 312 and 314 are provided with complementary offsets, 324, 326, 336, 338 between which are two "intermediate" portions 332 and 334 of the two inside wires 312 and 314.

As best seen in FIG. 11 and FIG. 12, the handle 308 is provided with a half-cylinder 350 having first and second opposing ends 352 and 354 and first and second elongated edges 356 and 358, best seen in FIG. 12.

The half-cylinder 350 is attached to the underside of the second portion 303 such that the inwardly-rounded concave surface 351 faces up. The opposite outwardly-rounded convex surface 353 faces down.

The half-cylinder 350 has a length substantially equal to the distance between the pairs of complementary offsets 324, 326 and 336, 338. The half-cylinder 350 also has a width W, substantially equal to the distance between the first edge 356 and the second edge 358. The width, W, is selected to be substantially equal to the horizontal separation distance 339 between the two outside wires 310 and 316 to which the edges 356 and 358 are attached. The edges 356 and 358 of the half-cylinder 350 are preferably rolled or formed to have horizontally-oriented attachment flanges 360 and 362, which can be welded directly to the outside wires 310 and 316. In an alternate embodiment, the attachment flanges 360 and 362 extend horizontally outward from the half-cylinder but roll upwardly to form opposing horizontal U-shaped clamps that can snap over the two outside wires 310 and 316 and thereby attach the half-cylinder 350 to the handle 308 mechanically, i.e., without welding.

As can be seen in FIG. 12, the half-cylinder 350 has a cross sectional shape that is substantially semi-circular. Alternate embodiments of the half-cylinder 350 have cross sectional shapes that are elliptical or oval. When the second portion 303 of the handle 308 is grasped by a user, the half-cylinder 350 provides a semi-circular grip the "feel" of which approximates a fully cylindrical handle making the handle 308 more ergonomic than various prior art rigid wire handles.

Figure 13:
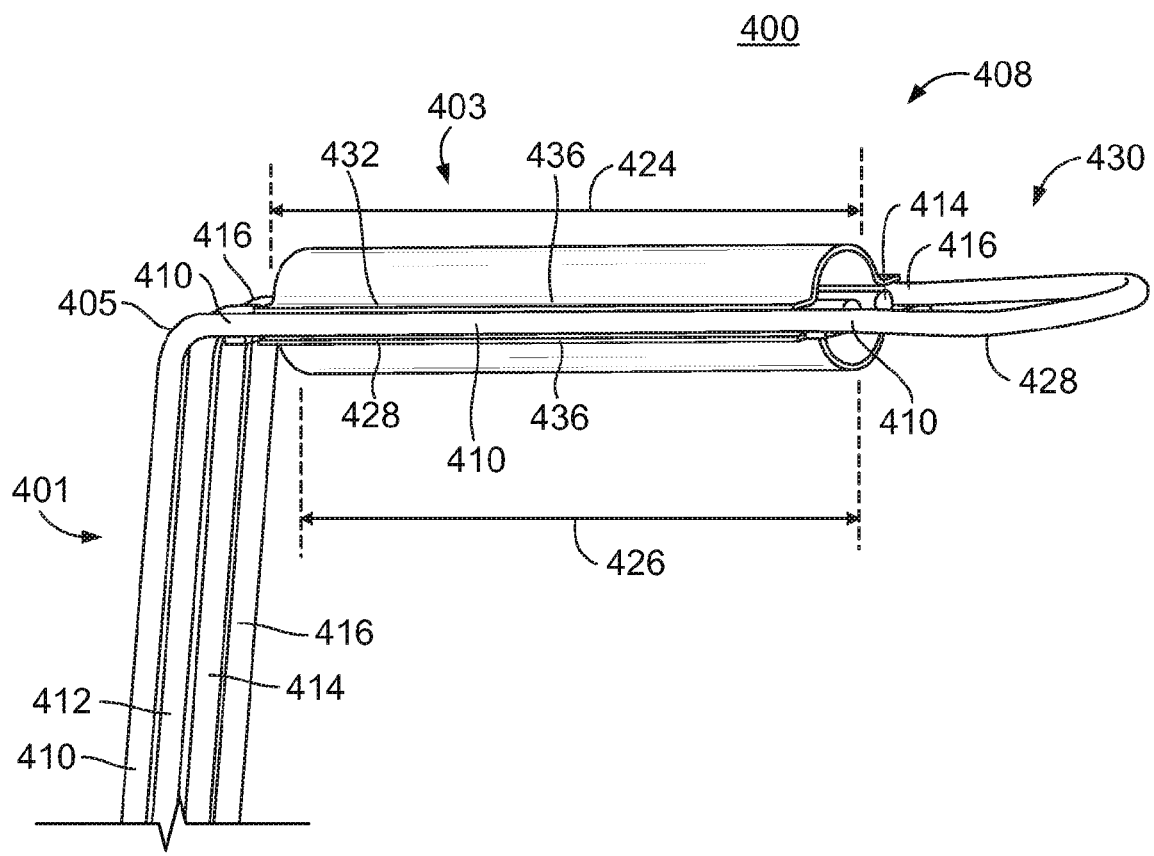
FIG. 13 is a perspective view of a fourth embodiment of a handle for a fry basket.
Figure 14:
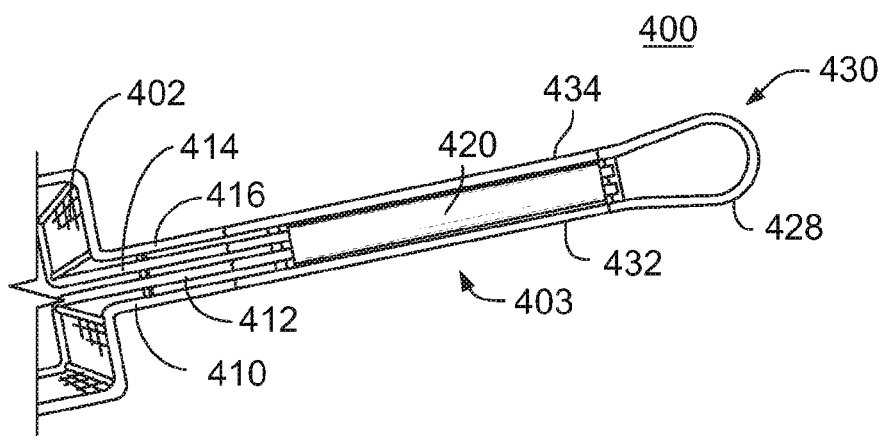
FIG. 14 is a top view of the basket shown in FIG. 13.
Figure 15:
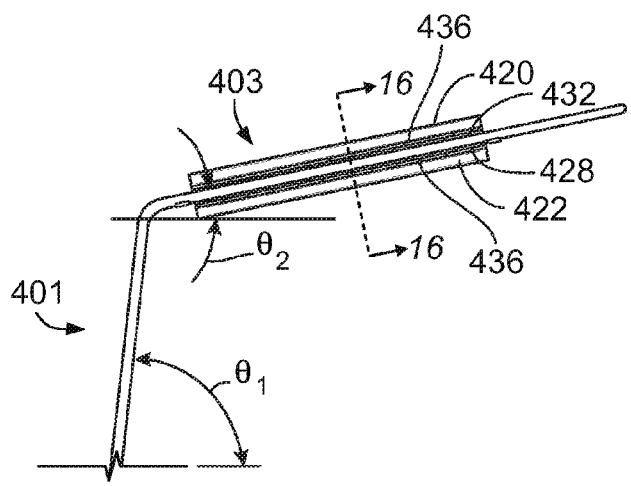
FIG. 15 is a side view of the basket shown in FIG. 13.
Figure 16:
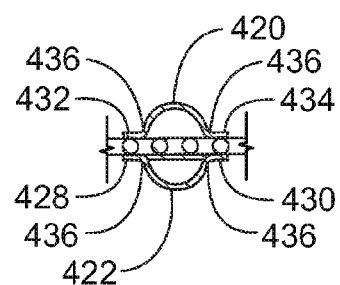
FIG. 16 is a sectional view of the handle shown in FIG. 13 taken through section lines 16-16.

FIGS. 13, 14, 15 and 16 depict another embodiment of a fry basket 400 having an ergonomic handle 408. FIG. 13 is a perspective view of the handle 408. FIGS. 14, 15 and 16 are top, side and sectional views respectively.

The fry basket embodiment shown in FIGS. 13, 14, 15 and 16 differs from the fry basket embodiment shown in FIGS. 9-12 by the attachment of two half-cylinders 420, 422 over or around, four rigid wires 410, 412, 414 and 416 that extend back from a bend 405 and that comprise the second portion 403 of the handle 408. The two half-cylinders 420, 422 provide an essentially cylindrical grip.

The four wires 410, 412, 414 and 416 that comprise the handle extend upwardly from the wire basket 402 at a first inclination angle $\theta_1$ to the bend 405. All of the wires extend away from the bend 405 at a second inclination angle $\theta_2$.

A top or first half-cylinder 420 has a length 424 substantially equal to the distance between the bend 405 and the loop 428 formed at the extreme end 430 of the handle. A second or bottom half-cylinder 422 has a length 426 that is substantially the same as the length 424 of the first half-cylinder 420.

Both half-cylinders 420, 422 are provided with attachment flanges, which are best seen in FIG. 16. The bottom half-cylinder 422 attachment flanges 428 and 430 are welded to the "bottom" of the two outside wires 410, 416. The top half-cylinder 420 attachment flanges 432 and 434 are welded to the "top" of the two outside wires 410, 416. The attachment flanges meet and are joined to the half-cylinders 420, 422 along seams or edges, 436, also best seen in FIG. 16.

As with the half-cylinder 350 shown in FIGS. 9-12, the half-cylinders 420, 422 shown in FIGS. 13-16 preferably have cross sectional shapes that are semi-circular, however, alternate embodiments of the half-cylinders 420 and 422 have cross sectional shapes that are elliptical.

Figure 17:
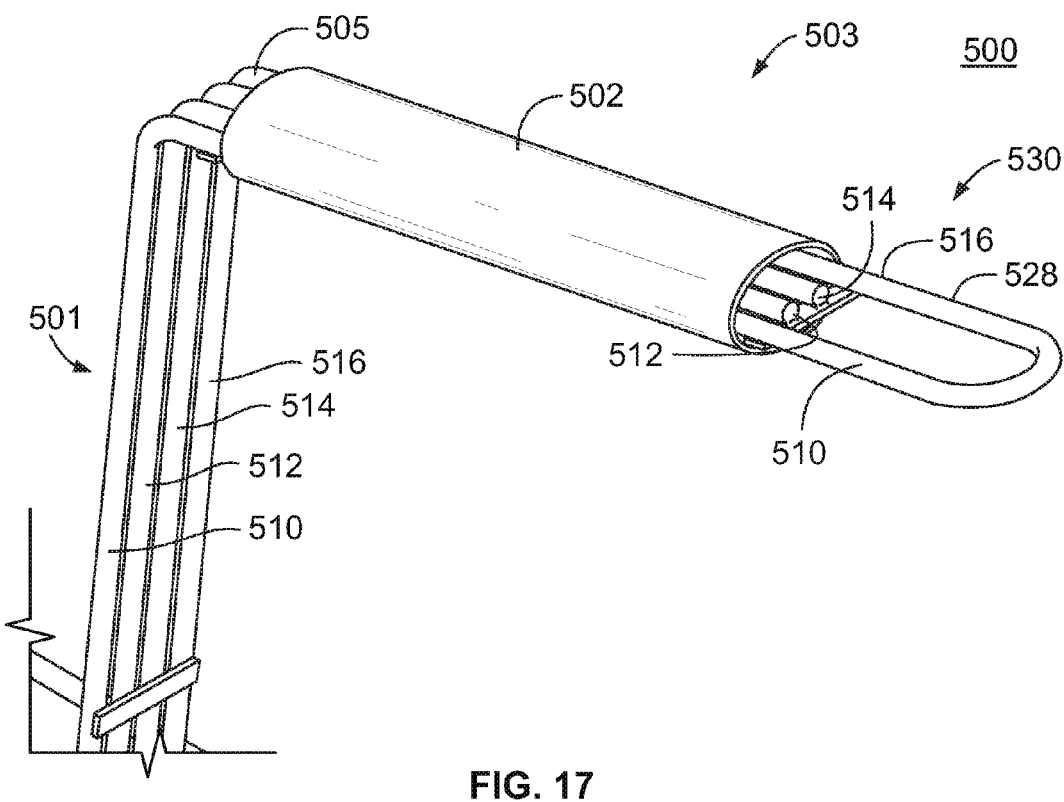
FIG. 17 is a perspective view of fifth embodiment of an ergonomic handle for a fry basket.
Figure 18:
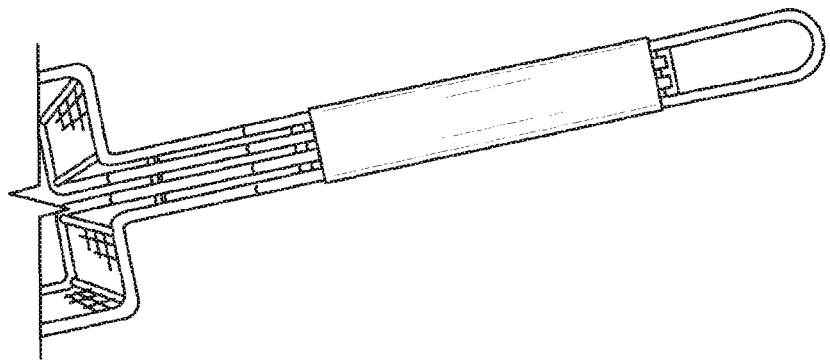
FIG. 18 is a top view of the handle shown in FIG. 17.
Figure 19:
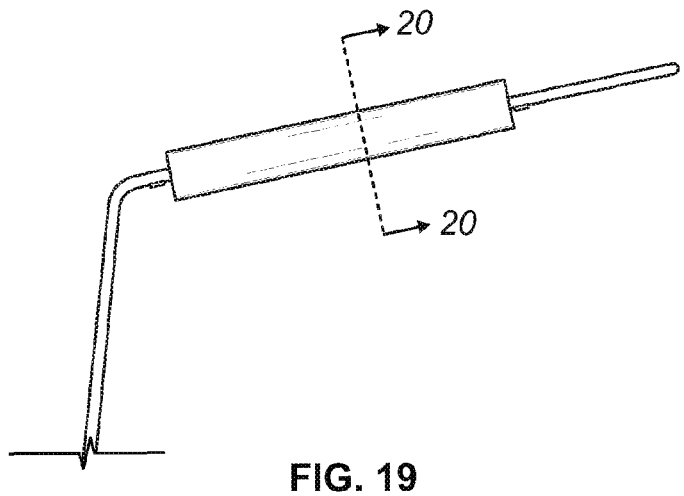
FIG. 19 is a side view of the handle shown in FIG. 17.
Figure 20:
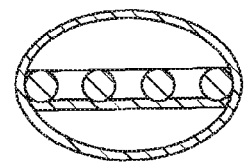
FIG. 20 is a sectional view of the handle shown in FIGS. 17-19 taken through section lines 20-20; and, FIG. 21 is a side view illustration of a handle offset.

FIG. 17 is a perspective view of yet another embodiment of an ergonomic handle 500 for a fry basket. In FIG. 17, a sleeve 502 having an elliptical cross section is slid over the four rigid wires 510, 512, 514 and 516 that extend from the bend 505. The sleeve 502 provides a smooth grip that is easier to grasp than four rigid wires that lie essentially co-planar to each other.

Those of ordinary skill in the art will appreciate that by spatially separating and arranging rigid wires in different transverse planes and different vertical planes that the "feel" of a rigid-wire handle can be significantly improved by approximating the shape of a smooth cylinder. The foregoing description is therefore for purposes of illustration. The scope of the invention is set forth in the following claims.

What is claimed is:

1. A fry basket comprising:
a wire mesh basket;
a frame comprised of rigid wire that is configured to support the wire mesh basket; and
a handle attached to the frame, the handle comprising first and second portions:
the first portion of the handle having a first length and comprising a first plurality of substantially straight rigid wires that extend away from the frame, substantially co-planar with each other in a first inclined horizontal plane through-out the first length of the first portion, said first inclined horizontal plane being at a first inclination angle relative to horizontal, the first plurality of wires extending at said first inclination angle to a bend in each wire whereat the first plurality of straight rigid wires continue to extend away from the frame in a second inclined horizontal plane that lies at a second inclination angle that is less than the first inclination angle,
the second portion of the handle extending from the bend in the wires and comprising both the first plurality of wires of the first portion and at least one additional rigid wire, which together comprise a second plurality of rigid wires, first and second ones of the second plurality of rigid wires being configured to be laterally spaced apart from each other by a first horizontal wire separation distance and extend substantially parallel to each other in the second inclined horizontal plane, third and fourth ones of the second plurality of rigid wires being configured to be laterally spaced apart from each other by a second horizontal wire separation distance greater than the first horizontal wire separation distance and extend substantially parallel to each other in a third inclined horizontal plane, which is substantially parallel to the second inclined horizontal plane but vertically offset from the second inclined horizontal plane by a first vertical offset separation distance, fifth and sixth ones of the second plurality of rigid wires being configured to be laterally spaced apart from each other by a third horizontal wire separation distance substantially equal to the first horizontal wire separation distance and extend substantially parallel to each other in a fourth inclined horizontal plane that is substantially parallel to the second and third inclined horizontal planes but vertically separated from the third inclined horizontal plane by a second vertical offset separation distance.

2. The fry basket of claim 1, wherein the first and second wires of the first plurality of wires lie outside other wires of the first plurality of wires in the first portion of the handle and are bent to form a loop, which is located beyond the second portion of the handle.

3. The fry basket of claim 2, wherein a plurality of portions of the wires in the second portion of the handle lie in a plurality of vertically oriented planes, the vertically oriented planes being laterally spaced apart from, and substantially parallel to, each other.

4. The fry basket of claim 3, wherein portions of each wire in the second portion of the handle lies in its own corresponding vertical plane, the vertical planes being substantially parallel to each other.

5. The fry basket of claim 4, wherein complementary offsets in the second portion of the handle comprise abrupt complementary bends in the rigid wires by which a first portion of a rigid wire forms a substantially straight portion lying in a transverse plane and wherein a second portion of the same rigid wire lies in a fourth transverse geometric plane, the second portion extending away from the handle and forming part of the frame.

6. A fry basket comprising:
a wire mesh basket;
a frame comprised of rigid wire that is configured to support the wire mesh basket; and
a handle attached to the frame, the handle comprising a plurality of rigid wires, each wire having a corresponding diameter, predetermined portions of predetermined wires being configured to lie in first and second transverse geometric planes, a first and fourth wire lying in the first transverse plane and being separated from each other by a second and third wire, the second and third wire being adjacent to each other and lying in the second transverse plane, the wires being laterally separated from each other by a wire separation distance, the first and second planes and wire portions lying therein being vertically separated from each other by a first distance;
the handle further comprising a half-cylinder having first and second elongated edges, a length, a width equal to the distance between the first and second edges, an inwardly-rounded concave surface between the edges that face the second and third rigid wires and an opposing outwardly-rounded convex surface between the edges that faces a user's hand when the handle is grasped by a user, the width of the half-cylinder being at least equal to the diameter of the second and third wires and the wire separation distance between them.

7. The fry basket of claim 6, wherein the half-cylinder has a cross-sectional shape that is substantially semi-circular.

8. The fry basket of claim 6, wherein the half-cylinder has a cross-sectional shape that is substantially elliptical.

9. The fry basket of claim 6, wherein the first and second edges of the half-cylinder are attached to the first and fourth rigid wires.

10. The fry basket of claim 6, wherein the half-cylinder further comprises first and second attachment flanges extending from the first and second edges respectively, the first and second attachment flanges being attached to the first and fourth wires.

11. The fry basket of claim 7, wherein the half-cylinder is configured to provide a substantially semi-cylindrical grip.

12. A fry basket comprising:
a wire mesh basket having a top and bottom;
a frame comprised of rigid wire that is configured to support the wire mesh basket; and
a handle attached to the frame, the handle comprising first and second substantially straight rigid wires, each wire having a corresponding diameter and configured to lie in a first inclined transverse geometric plane such that the wires are substantially parallel to each other and laterally separated from each other in the transverse plane by a separation distance, the inclined transverse geometric plane being inclined at a first angle relative to both the top of the basket and relative to horizontal;

a first half-cylinder having first and second elongated edges, a length, a width equal to the distance between the first and second edges, an inwardly-rounded concave surface between the edges that faces downwardly and an opposing outwardly-rounded convex surface between the edges that faces upwardly and into a user's hand when the handle is grasped by a user;

a second half cylinder, having third and fourth elongated edges, a length, a width equal to the distance between the third and fourth edges, an inwardly-rounded concave surface between the edges that faces upwardly and an opposing outwardly-rounded convex surface between the edges that faces downwardly and into a user's hand when the handle is grasped by a user; the first and second half cylinders being joined to each other and surrounding the handle whereby the first and second half cylinders are also inclined at said first angle relative to the top of the basket and relative to horizontal;

said first angle being between about ten degrees and about forty degrees, relative to horizontal;

wherein the first half-cylinder further comprises first and second attachment flanges extending from the first and second edges respectively, and wherein the second half-cylinder further comprises third and fourth attachment flanges extending from the third and fourth edges respectively, the first and second attachment flanges being attached to the first and second wires respectively, the third and fourth attachment flanges being attached to the first and second wires respectively.

13. The fry basket of claim 12, wherein at least one of the first half-cylinder and second half-cylinder has a cross-sectional shape that is substantially semi-circular.

14. The fry basket of claim 12, wherein at least one of the first half-cylinder and second half-cylinder has a cross-sectional shape that is substantially elliptical.

15. The fry basket of claim 12, wherein the first and second edges of the first half-cylinder are attached to the first and second substantially straight rigid wires and wherein the third and fourth edges of the second half-cylinder are attached to the first and second substantially straight rigid wires.

16. The fry basket of claim 12, wherein the first and second half cylinders are configured to provide a substantially cylindrical grip.

17. The fry basket of claim 12, further comprising third and fourth wires, each of the wires having a corresponding diameter and configured to lie in the first transverse geometric plane such that the first, second, third and fourth wires are substantially parallel to each other and laterally separated from each other in the transverse plane by a wire separation distance.

* * * * *